United States Patent Office 3,399,774
Patented Sept. 3, 1968

3,399,774
SCREENING CENTRIFUGES
Per Nyrop, Norwalk, Conn., assignor to Dorr-Oliver Incorporated, Stamford, Conn., a corporation of Delaware
Filed Feb. 23, 1967, Ser. No. 618,191
8 Claims. (Cl. 210—213)

ABSTRACT OF THE DISCLOSURE

The present invention relates to a washing arrangement for screening centrifuges wherein the vanes of the helical conveyor are bent in the area of the wash zone to conform to the pitch of the wash liquid discharge openings.

---

Figure 1:
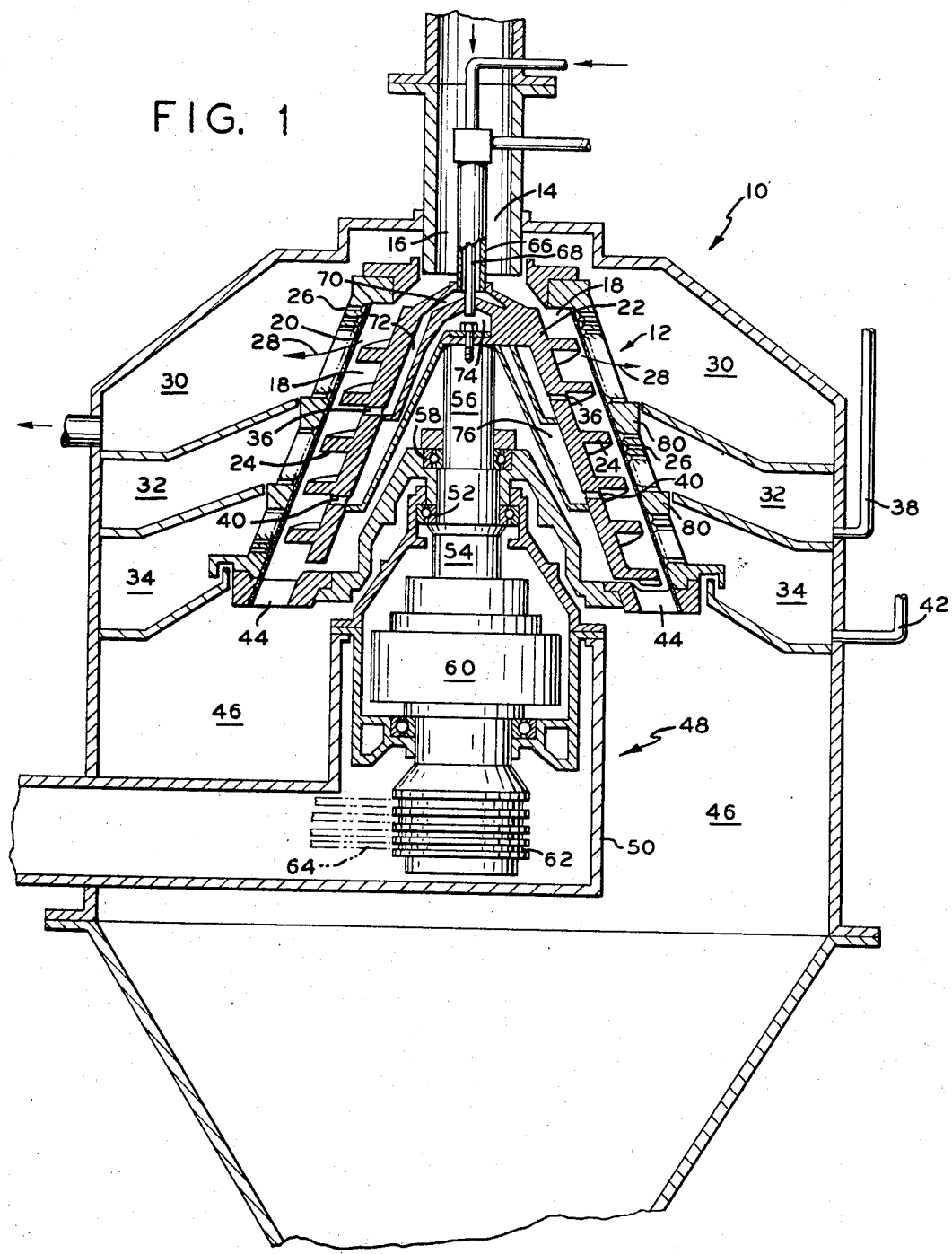

The present invention relates to screening centrifuges of the type having a screen, a conveyor to move solids along the screen, and to an improved washing apparatus for use in conjunction with the screen and the conveyor. On such devices the feed material, which is usually a solids bearing mother liquor, is introduced at one end of the screen and subjected to the centrifugal forces created by the rapid rotation of the screen. The feed material is fractionated into its component parts by the centrifugal action, with the mother liquor passing through the screen and the solids being retained on the screen.

The conveyor which has a plurality of helical vanes, is positioned concentrically within the screen and is rotated at a slightly different speed than the screen to effect an apparent traverse thereof, from the feed end to the discharge end, to control the axial movement of the solids along the screen. After the initial separation of the feed material into mother liquor and solids, the solids, under the control of the conveyor, are moved into a series of wash zones. A washing liquid is applied and any remaining mother liquor or impurities are removed.

Because of the continuous progressive movement of the retained solids through the washing zones, and the reasonable size limitations placed on the centrifuge, the detention time in each zone is necessarily limited. The efficiency of the washing operation thus depends to a large extent, on the amount of wash liquid that can be brought into contact with the solids within the defined wash period. In addition to the limited time the solids are detained in the wash zone, investigation of the washing operation in screening centrifuges has revealed that a significant amount of the wash liquid never comes in contact with the solids on the screen. Two explanations have been offered for the phenomena. First, the spray characteristics of the wash liquid, once discharged radially in the direction of the retrained solids, cannot be sufficiently controlled so that the wash liquid can be directed to a particular area on the screen. The combination of forces acting on the wash liquid, as it is discharged, spread the wash liquid over a greater area on the screen than the corresponding cross-sectional area of the discharge opening. Second, the retained solids, instead of sliding evenly along the screen and thus over the entire wash zone, tend to congregate along the leading face of the blade of the helical conveyor. The result is a sort of thick "rolling rope" which covers only a small portion of the total area inundated by the wash liquid. This problem is further compounded because, as is well known in the art, the wash liquid will seek egress at the greatest radial distance from the axis of rotation. Therefore to get an even distribution of wash liquid in the wash zone all the wash liquid discharge openings must be at the same radial distance from the axis of rotation, i.e., in the same transverse plane. Since the helical vanes of the conveyor are at an angle relative to the washing liquid discharge openings it is only at those points where the transverse plane defined by the washing liquid discharge openings intersects the helical vanes of the conveyor that the solids are contacted by washing liquid. Efforts to improve efficiency by increasing the amount of wash liquid introduced into the system are largely ineffective because this only increases the amount of wash liquid which is wasted.

Applicant's approach to this problem improves wash zone efficiency by taking advantage of the "rolling rope" configuration of the solids retained on the screen and by maintaining the same transverse plane for the discharge openings for the wash liquid. Applicant's solution is to change the pitch of the helical vanes of the conveyor in the wash zone so as to be parallel with the slope of the wash liquid discharge openings. In addition, applicant repositions the wash liquid discharge openings immediately adjacent to the leading face of the helical vanes of the conveyor. In this manner, the thick "rolling rope" of retained solids will be positioned directly opposite, and parallel to, the wash liquid discharge openings in the wash zone. The result is a thorough and efficient scrubbing of the retained solids with a minimum amount of wash liquid.

Applicant has further improved the efficiency of the wash zone by interposing a solid band, either on the screen or on the cage supporting the screen, directly opposite the wash liquid discharge openings. The use of an imperforate band momentarily retains the wash liquid on the screen and in contact with the retained solids to increase the effective washing time of the wash zone. The wash liquid is then drained from the scrubbed solids when they are conveyed out of the wash zone.

Accordingly, it is a primary object of the present invention to improve the washing efficiency of screening centrifuges.

It is a further object of the present invention to alter the slope of the vanes of the helical conveyor in the wash zone of a screening centrifuge.

It is another object of the present invention to orient the blades of the helical conveyor in the wash zone of a screening centrifuge into a plane parallel to the wash liquid discharge openings.

In conjunction with the foregoing objects, a still further object of the present invention is to provide means which will allow for retention of the wash liquid in the wash zone of a screening centrifuge.

Figure 2:
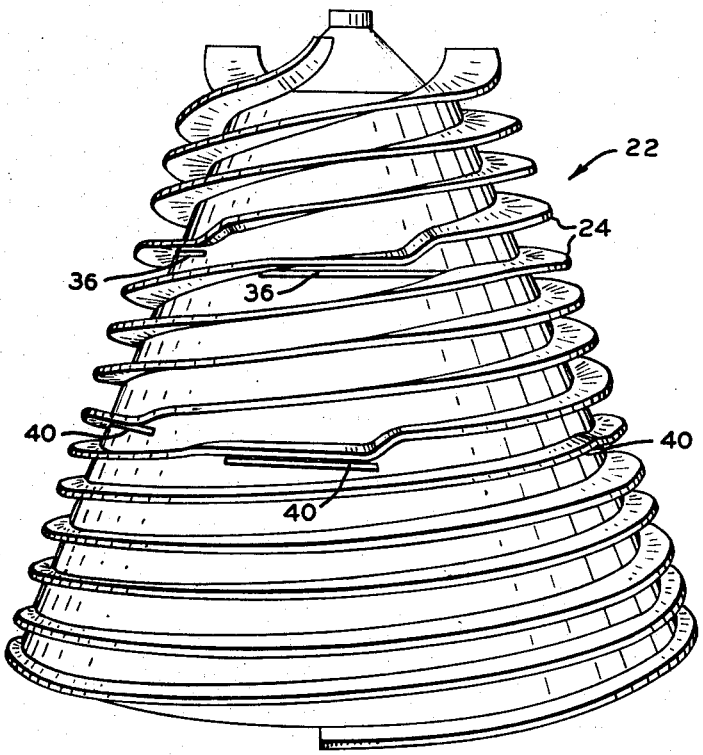

The subject matter which applicant regards as his invention is particularly pointed out and distinctly claimed in the concluding portion of this specification. The invention, however, as to its organization and method of operation together with further objects and advantages thereof will best be understood by reference to the following description taken in conjunction with the accompanying drawings in which:

FIGURE 1 is an elevational cross-sectional view of the screening centrifuge that incorporates the instant invention; and FIGURE 2 is an elevational perspective view of the helical conveyor of the screening centrifuge that incorporates the instant invention.

Referring to the drawings a screening centrifuge 10 is shown to illustrate an exemplary application of the present invention. However it should be understood that the present invention is not limited in its application to the particular centrifugal apparatus disclosed.

Screening centrifuge 10 includes a rotor 12 having an inlet opening 14 for feeding materials to be separated to the rotor as indicated by arrows 16. The feed material, which is usually a solids bearing mother liquor passes through the opening 14 to an annular conical space 18 situated between a frusto-conical separating screen 20 and a concentric rotating conveyor 22 having a plurality of helical vanes 24. The separating screen 20 is fixedly attached to the interior surface of a rapidly rotating perforated cage or screen support 26. Rotation of the cage 26 and separating screen 22 creates centrifugal forces in the conical space 18 which, as is well known in the art, urges the feed material against the screen and fractionates the material into its solid and liquid components. The screen retains the solids while the liquid is pushed through the screen, as indicated by arrows 28, to be collected in initial receiving chamber 30.

Following the disentrainment of the solids from the mother liquor the solids are moved along the screen under the control of the helical conveyor from the first treatment zone, defined by the initial receiving chamber 30, sequentially through the next two treatment zones, defined by respective receiving chambers 32 and 34 which surround the rotor 12. In the intermediate treatment zone a wash liquid from discharge openings 36 enters conical space 18 and intercepts the axial path of the solids to remove any remaining mother liquor and/or impurities. The resulting first wash solution is centrifugally passed through separating screen 20 and cage 26 where it is collected in receiving chamber 32 for discharge through conduit 38. The final treatment zone provides an additional wash for the retained solids to insure the purity of the final product. Wash liquid for the operation enters conical space 18 through wash liquid discharge openings 40 and is recovered in chamber 34 for discharge through conduit 42. The wash liquid discharge openings 36 and 40 may be either a plurality of elongated slots as shown in FIGURE 2 or a series of openings or nozzles (not shown).

The separated solids are then discharged by the helical conveyor through exits 44 into hopper 46.

Drive head assembly 48, which rotatably supports and drives the cage and the helical conveyor of the rotor, includes a fixed support housing 50 and bearing assemblies 52. An annular outer shaft assembly 54, which drives cage 26, is mounted to rotate within bearing assemblies 52. A coaxial inner shaft assembly 56, which drives helical conveyor 22 by a series of keys (not shown) is mounted by bearing assembly 58 to rotate within outer shaft assembly 54. The drive ends of shaft assemblies 54 and 56 are rotated at slightly differential speeds by a suitable drive arrangement such as transmission 60 powered by pulley 62; driven by a belt or belts 64 which extend from a power source such as a motor (not shown).

The top end of the conveyor 22 has two concentric wash liquid conduits 66 and 68 concentric with feed inlet 14 to introduce wash liquid into the rotor. Wash liquid for the intermediate treatment zone, defined by receiving chamber 32, feeds from conduit 66 into chamber 70 and from there through feed channels 72 to discharge openings 36. Wash liquid for the final treatment zone, defined by receiving chamber 34, feeds from conduit 68 into chamber 74 and from there through feed channel 76 to discharge openings 40.

As can be seen from FIGURE 2 all the wash liquid discharge openings 36 are on the same transverse plane and all the wash liquid discharge openings 40 are on the same transverse plane. This is because the wash liquid will seek egress from the point having the greatest radial distance from the axis of rotation; thus to insure an even distribution of wash liquid through all the discharge openings 36 and 40 each point along discharge openings 36 and 40 must have the same radial distance from the axis of rotation.

In prior art washing arrangements the wash liquid would contact the retained solids only at those points where the transverse wash liquid discharge openings would intercept the sloping helical vanes of the conveyor. Washing efficiency was further reduced in prior art washing arrangements by the difficulty in controlling the spray area inundated by the wash liquid once it is released from the discharge openings, and by the "rolling rope" configuration assumed by the retained solids in their axial transfer along the separating screen. Since the retained solids covered only a small part of the area inundated by the wash liquid spray and the wash liquid would only intercept the retained solids at defined points, a significant amount of wash liquid never contacted the retained solids and was wasted.

Applicant has improved washing operation efficiency and alleviated these difficulties which are inherent in the described type of screening centrifuges by taking advantage of the "rolling rope" configuration of the retained solids and the necessity of having the wash liquid discharge openings on the same transverse plane. Applicant's solution to the problem is to alter the slope of the helical vanes 24 in the wash zone so that they conform to, and are parallel with, the transverse wash liquid discharge openings. In addition, applicant has repositioned the wash liquid discharge openings immediately adjacent the leading face of the helical vane 24 so that the retained solids, when in the washing zone, will be directly opposite to, and parallel with, the wash liquid discharge openings. In this manner, all the wash liquid discharged from openings 36 and 40 will come in contact with, and thoroughly scrub, the solids retained on the screen to obtain the maximum washing effect with the minimum wash liquid.

To further increase the efficiency of the washing operation, applicant has included an imperforate band 80 on the cage 26 directly opposite the wash liquid discharge slots 36 and 40 to momentarily retain the wash liquid in the solids while the solids are in the wash zone. The retention period of the wash liquid in the solids insures a more thorough mixing of the solids and the wash liquid and a more efficient utilization of the washing liquid.

As this invention may be embodied in several forms without departing from the spirit or essential character thereof, the present embodiment is illustrative and not restrictive. The scope of the invention is defined by the appended claims rather than by the description preceding them, and all embodiments which fall within the meaning and equivalency of the claims are therefore intended to be embraced by those claims.

I claim:
1. A screening centrifuge comprising:
 (a) an annular screening means to fractionate feed material being treated in said centrifuge into a fraction retained on said screening means and a fraction centrifugally forced through said screening means;
 (b) conveyor means having a feed end and a discharge end and at least one helical vane, said vane being inclined relative to the axis of rotation of said conveyor means and following a path of substantially constant angle of inclination from the feed end of said conveyor means to the discharge end of said conveyor means to substantially continuously move the fraction retained on said screening means axially along said screening means;
 (c) at least one wash means in said conveyor means to discharge a wash liquid against the fraction retained on said screening means, said wash means having at least one discharge means to direct the outward flow of the wash liquid, said discharge means being positioned in said conveyor means in a plane substantially normal to the axis of rotation of said conveyor means; said vane of said helical conveyor means discontinuing its inclined path and being oriented in a plane parallel to said discharge means when in the zone defined by said discharge means, said conveyor means being perforate only in the zone defined by said discharge means.

2. A screening centrifuge as defined in claim 1 wherein said discharge means is positioned immediately adjacent the leading face of said helical vane.

3. A screening centrifuge as defined in claim 1 wherein said screening means has an annular imperforate band directly opposite said wash liquid discharge means.

4. A conveyor for controlling the movement of retained solids in a screening centrifuge comprising an annular shell having a feed end and a discharge end, at least one helical vane on said shell, said vane being oriented in an inclined plane relative to the axis of rotation of said shell, winding around said shell at a substantially constant angle of inclination from the feed end to the discharge end to maintain substantially continuous movement of the retained solids axially along said screening centrifuge, said shell having at least one discharge means to discharge a wash liquid on to the retained solids in said screening centrifuge, said discharge means being oriented in a plane substantially normal to the axis of rotation of said shell, said helical vane changing its inclined path relative to the axis of rotation of said shell and being reoriented into a plane parallel to said discharge means when in the zone defined by said discharge means, said conveyor being perforate only in the zone defined by said discharge means.

5. A conveyor for a screening centrifuge as defined in claim 4 wherein said discharge means comprises an elongated slot.

6. A conveyor for a screening centrifuge as defined in claim 4 wherein said discharge means comprises a series of openings.

7. A screening centrifuge comprising:
 (a) an annular screening means to fractionate feed material being treated into a fraction retained on said screening means and a fraction centrifugally forced through said screening means;
 (b) conveyor means having a feed end and a discharge end and at least one helical vane to control the axial movement of the fraction retained on said screening means along said screening means, said vane following a generally inclined path relative to the axis of rotation of said conveyor means, winding its way around said conveyor means at a substantially constant angle of inclination from the feed end of said conveyor means to the discharge end of said conveyor means;
 (c) at least one wash means in said conveyor means to discharge a wash liquid against the fraction retained on said screening means, said wash means having at least one elongated discharge means to direct the outward flow of the wash liquid, said discharge means being positioned in said conveyor means in a plane substantially normal to the axis of rotation of said conveyor means, the path traced by said helical vane as it winds from the feed end to the discharge end of said conveyor means also being inclined relative to the elongated wash liquid discharge means; said vane discontinuing its inclined path relative to the wash liquid discharge means when in a zone defined by the confines of said elongated wash liquid discharge means and reorienting itself into a plane parallel to said elongated wash liquid discharge means, said conveyor means being perforate only in the zone defined by said elongated wash liquid discharge means.

8. A screening centrifuge as defined in claim 7 wherein said elongated wash liquid discharge means comprises an array of closely spaced apertures.

References Cited

UNITED STATES PATENTS

| 1,650,685 | 11/1927 | Behr | 210—377 X |
| 1,749,368 | 3/1940 | Behr | 210—374 |
| 2,283,457 | 5/1942 | Pecker | 210—374 |
| 2,870,912 | 1/1959 | Mathieu | 210—374 X |
| 3,289,843 | 12/1966 | Nyrop | 210—374 |

FOREIGN PATENTS 859,429 12/1952 Germany.

REUBEN FRIEDMAN, *Primary Examiner.*

J. DE CESARE, *Assistant Examiner.*